(12) United States Patent
Beck et al.

(10) Patent No.: US 10,463,061 B2
(45) Date of Patent: *Nov. 5, 2019

(54) MODIFIED PLANT GUMS FOR PREPARATIONS OF ACTIVE INGREDIENTS

(75) Inventors: Markus Beck, Lörrach (DE); Bruno H. Leuenberger, Allschwil (CH); Christina Rebernig-Staiger, Rheinfelden (DE); Christian Schaefer, Rheinfelden (DE); Gerhard Wagner, Wehr (DE)

(73) Assignee: DSM IP ASSETS B.V., Heerlen (NL)

( * ) Notice: Subject to any disclaimer, the term of this patent is extended or adjusted under 35 U.S.C. 154(b) by 951 days.

This patent is subject to a terminal disclaimer.

(21) Appl. No.: 11/666,843

(22) PCT Filed: Nov. 18, 2005

(86) PCT No.: PCT/EP2005/012369
§ 371 (c)(1),
(2), (4) Date: Sep. 8, 2008

(87) PCT Pub. No.: WO2006/053761
PCT Pub. Date: May 26, 2006

(65) Prior Publication Data
US 2009/0010861 A1    Jan. 8, 2009

(30) Foreign Application Priority Data
Nov. 19, 2004 (EP) .................. 04027588

(51) Int. Cl.
| | |
|---|---|
| *A23K 50/80* | (2016.01) |
| *A23L 2/52* | (2006.01) |
| *A23L 2/58* | (2006.01) |
| *C08B 37/00* | (2006.01) |
| *A23K 20/179* | (2016.01) |
| *A23K 20/147* | (2016.01) |

(Continued)

(52) U.S. Cl.
CPC ............ *A23K 50/80* (2016.05); *A23K 20/147* (2016.05); *A23K 20/163* (2016.05); *A23K 20/179* (2016.05); *A23K 50/75* (2016.05); *A23L 2/52* (2013.01); *A23L 2/58* (2013.01); *A23L 5/43* (2016.08); *A23L 29/20* (2016.08); *A23L 29/25* (2016.08); *A23L 33/10* (2016.08); *C08B 37/0087* (2013.01); *Y02A 40/818* (2018.01)

(58) Field of Classification Search
CPC ... A23L 1/053; A23L 2/52; A23L 2/58; A23L 1/05; A23L 1/0528; A23L 1/054; A23L 1/2751; A23L 1/2753; A23L 1/30; A23L 1/3006; A23L 1/303; A23L 29/20; A23L 29/25; A23L 33/10; A23L 5/43; C08B 37/0087; A23K 1/1606; A23K 1/1631; A23K 1/1643; A23K 1/1826; A23K 1/188; A23K 20/147; A23K 20/163; A23K 20/179; A23K 50/75; A23K 50/80; A23V 2002/00; A23V 2250/211; A23V 2250/5022; A23V 2250/5028; A23V 2250/712; A61K 47/36; A61K 8/31; A61K 8/60; A61K 8/671; A61K 8/678; A61K 8/73; A61K 9/0014; A61Q 19/00; C08K 5/005; C08K 5/01; C08K 5/103; C08K 5/1545; C08L 2666/26; C08L 3/02; C08L 5/00; C12P 19/04; C12Y 203/00; C12Y 302/00; C12Y 304/00; Y02A 40/818; Y02P 20/52

See application file for complete search history.

(56) References Cited

U.S. PATENT DOCUMENTS

| | | | | |
|---|---|---|---|---|
| 2,897,119 A | * | 7/1959 | Dunn ................ | A61K 31/59 424/489 |
| 3,227,561 A | * | 1/1966 | Hiroyuki ............ | A23L 5/44 106/493 |

(Continued)

FOREIGN PATENT DOCUMENTS

| | | |
|---|---|---|
| CA | 1340242 | 12/1998 |
| DE | 483070 | 9/1929 |

(Continued)

OTHER PUBLICATIONS

Chudzikowski. Guar Gum and its Applications. J. Soc. Cosmet. Chem. 22. 43-60. 1971. pp. 43-60.*

(Continued)

*Primary Examiner* — Aaron J Kosar
(74) *Attorney, Agent, or Firm* — McBee Moore Woodward & Vanik IP, LLC

(57) ABSTRACT

The present invention relates to compositions containing (fat-soluble) active ingredients and/or colorants in a matrix based on modified plant gums, i.e. plant gums that have been submitted to hydrolysis to degrade either the protein portion and/or where appropriate, the polysaccharide, and to a process for preparing these compositions as well as to modified plant gums, whose protein part is hydrolyzed up to a degree of about 30%, preferably to a degree of from about 0.05 to about 30%, and/or whose polysaccharide part is hydrolyzed up to a degree of about 50%, a process for the manufacture thereof and such modified plant gums themselves. The present invention further relates to the use of the compositions of this invention for the enrichment, fortification and/or for the coloration of food, beverages, animal feed, cosmetics and pharmaceutical compositions and to such food, beverages, animal feed, cosmetics and pharmaceutical compositions themselves.

12 Claims, No Drawings

(51) Int. Cl.
*A23K 20/163* (2016.01)
*A23K 50/75* (2016.01)
*A23L 29/20* (2016.01)
*A23L 29/25* (2016.01)
*A23L 5/43* (2016.01)
*A23L 33/10* (2016.01)

(56) References Cited

U.S. PATENT DOCUMENTS

| | | | | |
|---|---|---|---|---|
| 3,891,620 | A * | 6/1975 | Cushman | A61K 47/36 106/238 |
| 4,332,894 | A * | 6/1982 | Whistler | 435/99 |
| 4,522,743 | A | 6/1985 | Horn et al. | |
| 5,023,095 | A * | 6/1991 | Kirk | A23L 1/2753 426/250 |
| 5,062,895 | A | 11/1991 | Pockrandt | |
| 5,520,948 | A * | 5/1996 | Kvamme | 426/590 |
| 5,753,295 | A | 5/1998 | Goldman | |
| 5,976,603 | A * | 11/1999 | Kota | A23L 2/395 426/443 |
| 6,063,411 | A * | 5/2000 | Jacobson | A23C 9/1522 426/522 |
| 6,093,348 | A | 7/2000 | Kowalski et al. | |
| 6,197,314 | B1 * | 3/2001 | Einig | 424/400 |
| 6,455,512 | B1 | 9/2002 | Ward | |
| 2004/0071824 | A1 | 4/2004 | Van Laere et al. | |

FOREIGN PATENT DOCUMENTS

| | | | | |
|---|---|---|---|---|
| EP | 0065193 | | 11/1982 | |
| EP | 0285682 | | 10/1988 | |
| EP | 0347751 | | 12/1989 | |
| EP | 0 482 070 | A2 * | 4/1992 | A23L 1/052 |
| EP | 0 483 070 | | 4/1992 | |
| EP | 0482070 | | 4/1992 | |
| EP | 0667619 | | 8/1995 | |
| EP | 0937412 | | 8/1999 | |
| EP | 0966889 | | 12/1999 | |
| EP | 1006761 | | 6/2000 | |
| EP | 1008380 | | 6/2000 | |
| EP | 101060174 | | 6/2001 | |
| EP | 1300394 | | 9/2003 | |
| FR | 2 815 824 | | 5/2002 | |
| JP | H03-122101 | A | 5/1991 | |
| JP | 2003-265128 | A | 9/2003 | |
| WO | 9815195 | | 4/1998 | |
| WO | 02102298 | | 12/2002 | |
| WO | 2004-030472 | A1 | 4/2004 | |
| WO | 2004054702 | | 7/2004 | |
| WO | WO 2004/054702 | | 7/2004 | |
| WO | 2004089991 | | 10/2004 | |
| WO | WO 2004/089991 | | 10/2004 | |
| WO | WO 2004/099991 | A * | 10/2004 | C08B 37/00 |

OTHER PUBLICATIONS

Nissen. Enzymatic Hydrolysis of Proteins for Increased Solubility. J. Agric. Food Chem. vol. 24. No. 6, 1976. pp. 1090-1093.*

Yamamoto et al. Zymolysis of Guar Gum and Properties of Decomposed Products. Denpun Kagaku (Starch Science) vol. 37, No. 2, 1990. pp. 99-105. English Translation.*

Hansen et al. Determination of Galactomannan in Guar . . . by High Performance Liquid Chromatography; J. Science Food Agric 1992, 59, 419-421.*

Scharf, A. Food Mater Equip. Jun;7(6):8. Abstract only. (Year: 1947).*

Yamamoto, et al., "Zymolysis of Guar Gum and Properties of Decomposed Products," Starch Science, 1990, vol. 37, No. 2, pp. 99-105.

Adler-Nissen, J., "Enzymatic Hydrolysis of Proteins for Increased Solubility," J. Agric. Food Chem., 1976, vol. 24, No. 6, pp. 1090-1093.

Chudzikowski, R.J., "Guar gum and its applications," J. Soc. Cosmet. Chem., 1971, vol. 22, pp. 43-60, Society of Cosmetic Chemists of Great Britian.

Chikamai et al., "Processing of gum arabic and some new opportunities", Food Hydrocolloids. 1997;10(3):309-316.

Anderson, "Nitrogen conversion factors for the proteinaceous content of gums permitted as food additives." Food Additives and Contaminants, 1986 3(3) 231-234.

* cited by examiner

MODIFIED PLANT GUMS FOR PREPARATIONS OF ACTIVE INGREDIENTS

This application is the National Stage of International Application No. PCT/EP2005/012369, filed Nov. 18, 2005.

The present invention relates to modified plant gums, a process for the manufacture thereof, as well as to compositions containing active ingredients, preferably fat-soluble active ingredients, and/or colorants in a matrix based on these modified plant gums and to a process for preparing these compositions.

The present invention further relates to the use of the compositions of this invention for the enrichment, fortification and/or for the coloration of food, beverages, animal feed, cosmetics or pharmaceutical compositions.

More particularly, the present invention relates to compositions comprising a plant gum, where the protein part has been hydrolysed up to a degree of 30% and/or the polysaccharide part has been hydrolysed up to a degree of 50%, and a (fat soluble) active ingredient and/or a colorant, especially a carotenoid, to a process for preparing these compositions and the use of these compositions as additives for the enrichment, fortification and/or for the coloration of food, beverages, animal feed, cosmetics or pharmaceutical compositions; and to food, beverages, animal feed, cosmetics or pharmaceutical compositions containing such compositions.

If plant gum as known in the prior art is used as matrix for compositions containing (fat-soluble) active ingredients and/or colorants, the physical parameters of such obtained compositions often differ due to quality differences in the plant gum. Therefore, a need exists for compositions, wherein the quality of the plant gum is standardized or even improved.

This need is fulfilled by compositions comprising
i) at least a modified plant gum, optionally with a protein content and preferably obtainable by the process of the present invention as described below,
ii) at least an active ingredient, especially a fat-soluble active ingredient, and/or a colorant, and
iii) optionally at least an adjuvant and/or an excipient.

Such compositions are used for the enrichment, fortification and/or coloration of food, beverage, animal feed, cosmetics or pharmaceutical compositions; said use being a further aspect of the invention. Moreover, the invention is related to food, beverage, animal feed, cosmetics or pharmaceutical compositions containing such compositions.

The components i) to iii) are in more detail described in the following.
Component i)

The term "plant gum composition" denotes any composition comprising plant gums as obtainable from natural plant gum sources. Examples of such plant gum compositions are mixtures of various gums from different sources as well as plant gum compositions containing further hydrocolloids, such as starch, modified starch, maltodextrin, etc. and optionally any typical emulsifier (as co-emulgator), such as mono- and diglycerides of fatty acids, polyglycerol esters of fatty acids, lecithins, sorbitan monostearate, and plant fibre or sugar.

As used herein, the term "plant gum" denotes a plant gum as it is found either in natural products such as exudates of plants or obtained by artificially wounding the plants ("tears of gum"), cleaning the exudates from dust by washing and drying the aqueous solutions or suspensions of the exudates by spray-drying and which has not been modified by enzymatic treatment or chemical derivatisation. However, the term "plant gum" is understood to include products which have undergone a fractionation step, such as filtration or centrifugation, products which have been thermally treated in a dry form, gums, the aqueous suspensions or solutions of which have been heated, and gums that have been extracted from plants.

Plant gums are polysaccharide based hydrocolloids, which can have a protein content of about ≤10 weight-%, especially of about ≤6 weight-%, preferably of from about 0.5 to about 6 weight-%, more preferably of about ≤4 weight-%, even more preferably of about 0.5 to about 4 weight-%, most preferably of about 2 to about 4 weight-%, based on the total weight of the plant gum.

The polysaccharide chains of plant gums contain various sugar units, e.g. $C_6$-sugars such as galactose, mannose and glucose, $C_5$-sugars such as arabinose, xylose, $C_6$-sugar acids such as glucuronic acid and galacturonic acid, $C_6$-desoxy-sugars such as rhamnose and fucose.

As a source for the plant gum all known gums, such as guar gum, carob gum (carob seed gum, carob bean gum, locust bean gum), tragacanth gum, tara gum, karaya gum, gum acacia (gum arabic), ghatti gum, cherry gum, apricot gum, tamarind gum, mesquite gum, larch gum, psyllium, or fenugreek gum can be used. Furthermore gums derived from microorganisms (bacteria, algae) such as xanthan gum (xanthum gum), seaweed gum, gellan gum, agar gum, or carrageenan can be used. For the purpose of the present invention, preparations of gum acacia (gum arabic) from *Acacia senegal* or *Acacia seyal*, especially in powder form, with a protein content of preferably about 0.5 to about 3 weight-%, based on the total weight of the plant gum, are preferred.

Plant gums e.g. from *Acacia senegal* are readily commercially available in the form of powders such as the product Quick Gum from the company Alfred L. Wolff. (Hamburg, Germany).

The term "modified plant gum" refers to plant gums which have been submitted to hydrolysis to degrade the polysaccharide and, where appropriate, the protein portion. Preferably the modified plant gum is a plant gum whose protein part is hydrolysed up to a degree of about 30%, preferably to a degree of from about 1 to about 30%, more preferably to a degree of from about 1 to about 10%, most preferably to a degree of from about 1 to about 5%. In certain embodiments of the present invention modified plant gums are used, the protein part of which is hydrolysed between 0.05 and 1%. In other preferred embodiments the modified plant gum is a plant gum whose polysaccharide part is hydrolysed up to a degree of about 50%, preferably to a degree of from about 0.05 to about 20%, more preferably to a degree of from about 1 to about 5%. One may also use modified plant gums whose protein part is hydrolysed up to a degree of about 30% (preferably to a degree of from about 0.05 to about 30%, more preferably to a degree of from about 0.05 to about 10%, most preferably to a degree of from about 0.05 to about 5%) and whose polysaccharide part is hydrolysed up to a degree of about 50% (preferably to a degree of from about 0.05 to about 20%, more preferably to a degree of from about 1 to about 5%).
Component ii)

The term "active ingredients" as used herein encompasses "fat-soluble active ingredients" as well as "water-soluble active ingredients". Preferred are "fat-soluble active ingredients".

The term "fat-soluble active ingredient" as used herein encompasses fat soluble vitamins and functionally related compounds which can be used for enrichment or fortification of food, beverages, animal feed, cosmetics or pharmaceutical compositions.

Examples of such fat soluble vitamins are the vitamins of the groups A, D, E or K or derivatives thereof such as their acetates, e.g. vitamin A acetate or tocopherol acetate, or their longer chain fatty acid esters, e.g. vitamin A palmitate or tocopherol palmitate.

Examples of functionally related compounds are e.g. polyunsaturated fatty acids (PUFAs) or derivatives thereof, triglycerides rich in polyunsaturated fatty acids such as eicosapentaenoic acid (EPA), docosahexaenoic acid (DHA) or γ-linolenic acid (GLA), or coenzyme Q 10 (CoQ 10). Also included are fat soluble sun filters, such as UV-A and UV-B filters used in sun care and cosmetic preparations.

The term "colorant" as used herein comprises a carotene or structurally related polyene compound which can be used as a colorant for food, beverages, animal feed, cosmetics or pharmaceutical compositions.

Examples of such carotenes or structurally related polyene compounds are carotenoids such as α-carotene, β-carotene, 8'-apo-β-carotenal, 8'-apo-β-carotenoic acid esters such as the ethyl ester, canthaxanthin, astaxanthin, lycopene, lutein, zeaxanthin or crocetin, α- or β-zeacarotene or mixtures thereof. The preferred carotenoid is β-carotene.

Therefore, a preferred aspect of the invention deals with compositions containing at least a modified plant gum and β-carotene as colorant. These compositions, when dissolved, dispersed or diluted in/with water to a final β-carotene concentration of 10 ppm are typically characterised by ultraviolet/visible-spectroscopy using deionised water as reference. At a sample thickness of 1 cm the dispersions show an extinction of at least 0.2 (preferably above 1.0) absorbance units at the wavelength of maximum optical density in the range of 400 to 600 nm. This is equivalent to a formal extinction coefficient of β-carotene in aqueous dispersion E(1%, 1 cm) of 200 to 1000 (preferably >1000).

It is understood that the above named substances of the categories "fat-soluble active ingredient" and "colorant" can also be used as mixtures within the compositions of the present invention.

In a preferred embodiment the amount of the modified plant gum i) is from about 0.5 to about 60.0 weight-%, the amount of the (fat-soluble) active ingredient and/or colorant ii) is from about 0.1 to about 80.0 weight-%, and the amount of the adjuvant and/or excipient iii) is from about 10 to about 95 weight-%, preferably from about 60 to about 90 weight-%, based on the total amount of the composition. Component iii)

Suitably, the compositions of the present invention (further) contain one or more excipients and/or adjuvants selected from the group consisting of monosaccharides, disaccharides, oligosaccharides and polysaccharides, glycerol, triglycerides (different from the triglycerides rich in polyunsaturated fatty acids mentioned above), water-soluble antioxidants and fat-soluble antioxidants.

Examples of mono- and disaccharides which may be present in the compositions of the present invention are sucrose, invert sugar, xylose glucose, fructose, lactose, maltose, saccharose and sugar alcohols.

Examples of the oligo- and polysaccharides are starch, modified starch and starch hydrolysates, e.g. dextrins and maltodextrins, especially those having the range of 5 to 65 dextrose equivalents (DE), and glucose syrup, especially such having the range of 20 to 95 DE. The term "dextrose equivalent" (DE) denotes the degree of hydrolysis and is a measure of the amount of reducing sugar calculated as D-glucose based on dry weight; the scale is based on native starch having a DE close to 0 and glucose having a DE of 100.

The triglyceride is suitably a vegetable oil or fat, preferably corn oil, sunflower oil, soybean oil, safflower oil, rapeseed oil, peanut oil, palm oil, palm kernel oil, cotton seed oil, olive oil or coconut oil.

Solid compositions may in addition contain an anti-caking agent, such as silicic acid or tricalcium phosphate and the like, and up to about 10 weight-%, as a rule about 2 to about 5 weight-%, of water.

The water-soluble antioxidant may be for example ascorbic acid or a salt thereof, preferably sodium ascorbate, watersoluble polyphenols such as hydroxytyrosol and oleuropein aglycon, epigallocatechingallate (EGCG) or extracts of rosemary or olives.

The fat-soluble antioxidant may be for example a tocopherol, e.g. dl-α-tocopherol (i.e. synthetic tocopherol), d-α-tocopherol (i.e. natural tocopherol), β- or γ-tocopherol, or a mixture of two or more of these; butylated hydroxytoluene (BHT); butylated hydroxyanisole (BHA); ethoxyquin, propyl gallate; tert. butyl hydroxyquinoline; or 6-ethoxy-1,2-dihydroxy-2,2,4-trimethylquinoline (EMQ), or an ascorbic acid ester of a fatty acid, preferably ascorbyl palmitate or stearate.

Depending on the pH of the aqueous matrix solution the ascorbic acid ester of a fatty acid, particularly ascorbyl palmitate or stearate, may alternatively be added to the water phase.

The compositions of the present invention may be solid compositions, i.e. stable, water-soluble or -dispersible powders, or they may be liquid compositions, i.e. aqueous colloidal solutions or oil-in-water dispersions of the aforementioned powders. The stabilised oil-in-water dispersions, which may be oil-in-water emulsions or may feature a mixture of suspended, i.e. solid, particles and emulsified, i.e. liquid, droplets, may be prepared by the methods described below or by an analogous manner.

More specifically, the present invention is concerned with stable compositions in powder form comprising one or more (fat-soluble) active ingredients and/or one or more colorants in a matrix of a modified plant gum composition.

Typically, a powder composition according to the present invention comprises

| Ingredient | Amount |
| --- | --- |
| a modified plant gum | about 0.5 to about 60 weight-%, preferably about 5 to about 50 weight-% |
| a fat soluble active ingredient and/or a colorant | about 0.1 to about 80 weight-%, preferably about 0.5 to about 60 weight-% |
| a mono- or disaccharide | 0 to about 70 weight-%, preferably 0 to about 40 weight-% |
| a starch hydrolysate | 0 to about 70 weight-%, preferably 0 to about 40 weight-% |
| glycerol | 0 to about 20 weight-%, preferably 0 to about 10 weight-% |
| a triglyceride | 0 to about 50 weight-%, preferably 0 to about 30 weight-% |
| one or more water-soluble antioxidant(s) | 0 to about 5 weight-%, preferably 0 to about 2 weight-% |
| one or more fat-soluble antioxidant(s) | 0 to about 5 weight-%, preferably 0 to about 2 weight-% |
| a starch | 0 to about 50 weight-%, preferably 0 to about 35 weight-% |
| anti-caking agent | 0 to about 5 weight-%, preferably about 1 weight-%, preferably about 0.5 to about 2 weight-% |
| water | 0 to about 10 weight-%, preferably about 1 to about 5 weight-% |

In still another aspect of the invention, the compositions according to the invention may additionally contain proteins (of plant or animal origin) or hydrolysed proteins that act as protective colloids, e.g. proteins from soy or lupin, or hydrolysed proteins from soy or lupin. Such additional proteins may be present in the formulations of the invention in an amount of from 1 to 50 weight-% based on the total amount of protein in the formulation.

In a further aspect of the invention the modified plant gum is cross-linked with at least one compound selected from the group consisting of reducing sugars, proteins including protein hydrolysates, peptides, glycoproteins or glycopeptides—dependent on the structure of the modified plant gum, because intra- and/or intermolecular cross-linking is achieved between a sugar-unit and an amino acid-unit.

In a preferred composition of the invention the modified (=hydrolysed; see below) plant gum has a protein content of from about 0.5 to about 6 weight-%, more preferably of from about 0.5 to about 4 weight-%, based on the total weight of the plant gum, and at least one type of cross-linking selected from the group consisting of cross-linking between the protein part of the modified plant gum with an added reducing sugar, cross-linking between the sugar/polysaccharide part of the modified plant gum with an added protein/peptide, cross-linking between the modified plant gum and glycoproteins or glycopeptides, and intra- and/or intermolecular cross-linking between the protein part and the sugar/polysaccharide part of the modified plant gum is present.

For the following see also step IX) below.

Such compositions with a cross-linked modified plant gum can be obtained by submitting mixtures additionally containing a reducing sugar, e.g. glucose, fructose, saccharose or xylose or a protein, peptide, glycoprotein or glycopeptide, to heat-treatment to cause cross-linking of the sugar with the protein in a Maillard type reaction, i.e. by thermally treatment, preferably at temperatures from about 30 to about 160° C., more preferably at temperatures form about 70 to about 100° C., most preferably at temperatures from about 80 to about 90° C.

The term "protein" hereby also encompasses "protein hydrolysates".

Cross-linking of the protein-containing plant gums with various proteins, protein hydrolysates, peptides, glycoproteins, or glycopeptides can also be achieved by treatment with cross-linking enzymes (acyltransferases, EC 2.3, e.g. transglutaminase, EC 2.3.2.13, protein-glutamine:γ-glutamyltransferase), i.e. by enzymatically treatment, conveniently carried out at temperatures from about 0 about 70° C., preferably at temperatures from about 20 to about 40° C.

Enzymatic cross-linking results in stable protein-containing polysaccharide networks, in the case of a transglutaminase by the formation of ε-(γ-glutamyl)-lysine isopeptide bonds. The use of glutamyl- and lysyl-containing proteins, protein hydrolysates, peptides, glycoproteins, or glycopeptides is preferred for the enzymatic cross-linking.

Both techniques, heat-treatment to cause cross-linking of the sugar with the protein in a Maillard type reaction and enzymatic cross-linking can be used for the incorporation of lipophilic moieties and can be carried out either in a dried form of the composition, or in an aqueous solution or suspension. The enzymatic cross-linking is preferably carried out in an aqueous solution or suspension.

Manufacture of Component i), the Modified Plant Gum

The modified plant gum can be manufactured by a process comprising the following steps:

A) preparing an aqueous solution or suspension of a plant gum having a dry mass content of from about 0.1 to about 60 weight-%, based on the total amount of the aqueous solution of suspension;

B) hydrolysing the plant gum solution or suspension of step a) until the desired degree of hydrolysis is reached;

C) optionally fractionating the hydrolysate of step b);

D) optionally converting the optionally fractionated hydroysate into a solid form.

Details of this process are discussed in the following.

Step A)

In step A) preferably an aqueous solution or suspension of a plant gum (as defined above) having a dry mass content of from about 5 to about 20 weight-% is prepared.

Step B)

Preferably the hydrolysis in step B) is achieved by adjusting the pH of the plant gum solution or suspension to a value of between about 2 and about 10, more preferably to a value of between about 2 and about 9, most preferably to a value of between about 4 and about 8. This is done by the addition of any organic and/or inorganic acid or base. Preferably such acid or base has a concentration of about 0.1 to 5 M, preferably of about 0.5 to about 2 M. Examples of organic acids are acetic acid, oxalic acid, malic acid, citric acid, tartaric acid, succinic acid and ascorbic acid.

Examples of inorganic acids are hydrochloric acid (preferred), sulfuric acid, nitric acid and phosphoric acid.

Examples of inorganic bases are (earth) alkali hydroxides such as sodium hydroxide (preferred), potassium hydroxide and calcium hydroxide.

The hydrolysis is carried out until the desired degree of hydrolysis is reached. In the case of the hydrolysis of a plant gum with a protein part, the desired degree of hydrolysis of the protein part is up to 30%, preferably from about 1 to about 30%, more preferably from about 1 to about 10%, most preferably from about 1 to about 5%. In certain embodiments of the present invention it is preferred to hydrolyse the protein part of the plant gum to a degree of between 0.05 and 1%. This degree of hydrolysis can be determined in a manner known to those skilled in the art, e.g. as described by Petersen, D., Nielsen, P. M., Cambmann C., Determination of the Degree of Hydrolysis (DH) based on OPA Reaction, ED-9512723 Novo Nordisk A/S, December 1995; Frister, H., Meisel, H., Schlimme, E., OPA method modified by use of N,N-dimethyl-2-mercaptoethylammonium chloride as thiol component, Fresenius J. Anal. Chem. 330 (1988) 631.

If a plant gum with a low content of protein such as gum acacia (gum Arabic) from *Acacia* senegal or *Acacia* seyal is used and the degree of hydrolysis is low it was found that a modified OPA method where the correction factors α and β were determined experimentally as described in example 7 gives more exact results of determining the degree of hydrolysis.

In other preferred embodiments the modified plant gum is a plant gum whose polysaccharide part is hydrolysed up to a degree of about 50%, preferably to a degree of from about 0.05 to about 20%, more preferably to a degree of from about 1 to about 5%. The relative degree of hydrolysis (relative to the polysaccharide part) can be determined by osmolality (W. Dzwokak and S. Ziajka, Journal of food science, 1999, 64 (3) 393-395; see also example 9). One may also hydrolyse the plant gums in such a way that the protein part is hydrolysed up to a degree of about 30% (preferably to a degree of from about 0.05 to about 30%, more preferably to a degree of from about 0.05 to about 10%, most preferably to a degree of from about 0.05 to about 5%) and that the polysaccharide part is hydrolysed up to a degree of about 50% (preferably to a degree of from about 0.05 to about 20%, more preferably to a degree of from about 1 to about 5%).

Step B) is preferably carried out at a temperature of from about 5 to about 120° C., more preferably from about 5 to about 70° C., most preferably from about 20 to about 55° C.

When step B) is carried out at a temperature of from about 5 to about 70° C. in a preferred embodiment of the invention a hydrolase is added and after the desired degree of hydrolysis is achieved the hydrolase is inactivated.

The hydrolase (EC 3; see http://www.chem.qmul.ac.ukli-ubmb/enzyme/EC3/) may be selected from the group consisting of proteases (EC 3.4), glycosylases (EC 3.2) and their mixtures.

The hydrolases can be from fruit, animal origin, bacteria or fungi. The hydrolase may have endo-activity and/or exo-activity. Therefore, enzyme-preparations of endo- and exoproteases may be used as well as enzyme preparations of endo- and exo-glycosylases or any of their mixtures. Preferably the glycosylases have pectolytic and/or hemicelluloytic activity. Usually the hydrolases show also unknown side activities, but which are not critical for the manufacture of the desired product.

Proteases for use in the process of the invention are available from the suppliers Novozymes, Genencor, AB-Enzymes, DSM Food Specialities Amano, etc. Preferred proteases are those of bacterial or fungal origin, e.g. from *Bacillus licheniformes* or *Aspergillus oryzae*. Enzyme preparations such as Alcalase or Flavourzyme as obtainable from the firm Novozymes may be used. An example of a protease produced from *Carica papaya*, a plant, i.e. an enzyme of fruit origin, is the commercially available Collupilin® of DSM Food Beverages, Delft, Netherlands.

Enzymes such as pectinases for use in the process of the invention are available from the suppliers, Novozymes, Genencor, AB-Enzymes, DSM Food Specialities etc. Preferred enzymes are those of fungal origin, e.g. *Aspergillus niger, Aspergillus aculeatus* or *Aspergillus oryzae*. Enzyme preparations such as Shearzyme or Pectinex as obtainable from the firm Novozymes may be used. An enzyme produced from *Aspergillus aculeatus* is e.g. the commercially available Peelzym® of Novozymes, Bagsvaerd, Denmark.

Examples of glycosylases are the commercially available enzyme preparations from the suppliers Novozymes, Genencor, AB-Enzymes, DSM Food Specialities, Amano, etc.

The hydrolase is added to provide a concentration of from about 0.01 to about 10 weight-%, preferably of from about 0.1 to about 1 weight-%, based on the dry weight of the plant gum. In a preferred embodiment of the process of the invention, the enzyme is added at once. The enzymatic hydrolysis may also be carried out stepwise. For instance, the hydrolase or a mixture of hydrolases is added to the incubation batch in an amount of e.g. 1% whereupon, e.g. after 5 to 10 minutes (at a temperature of 35° C.) further hydrolase or a mixture of hydrolases which may by the same or different from the first added hydrolase or mixture of hydrolases is added, e.g. in an amount of 2% whereupon the incubation batch is hydrolysed at 35° C. for 10 minutes enzyme preparations of endo- and exo-glycosylases or any of their mixtures. The hydrolases can be from fruit, animal origin, bacteria or fungi. Using this procedure, starting plant gums featuring a protein content having a degree of hydrolysis of approximately zero can be used.

The duration of hydrolysis may vary between about a few seconds and about 300 minutes and is preferably from about 1 to about 30 minutes, more preferably from about 5 to about 10 minutes. In the case of the use of glycosylases the exact duration of the enzymatic treatment may be determined in an empirical way with respect to the desired properties of the modified gum, such as emulsifying stability, emulsifying capacity, droplet size of the emulsion, depending strongly on parameters like enzyme activities, or composition of the substrate. Alternatively it may be determined by measuring the osmolality as described in example 9.

The inactivation of the hydrolase is suitably achieved by heat denaturation, e.g. by heating of the incubation batch to about 80 to 85° C. for 5 to 30 minutes, especially for 5 to 10 minutes.

Step C)

Step C) may be carried out by centrifugation or filtration, preferably by ultrafiltration.

Step D)

The conversion into a solid form, e.g. a dry powder, can be achieved by spray drying or freeze-drying. Spray drying is preferably performed at an inlet temperature of about 200° C. to about 210° C. and at an outlet temperature of about 70° C. to about 75° C. The freeze-drying is preferably performed at a temperature of from about −20° C. to about −50° C. for 10 to 48 hours.

Thus the modified plant gum may be obtained by adjusting an aqueous solution or suspension of plant gums having a dry mass content of from about 0.1 to about 60%, preferably of from about 5 to about 20 weight-% based on the total amount of the plant gum solution or suspension, to a pH between about 0 and about 14, preferably to a pH between about 1 and about 3 or between about 9 and about 12 and heating the suspension to temperatures of from about 55 to about 130° C., especially to temperatures of from about 75 to about 95° C., and optionally fractionating the solution or suspension, e.g. by procedures such as centrifugation or (ultra-) filtration and converting the fractionated plant gum into a solid form. Prior to drying, the modified plant gum fractions may be submitted to heat treatment (pasteurisation) e.g. by heating to 80 to 85° C. for 5 to 10 minutes to stabilise the product against microbial deterioration.

A further aspect of the invention refers to a process for the manufacture of a modified plant gum comprising the following steps:

a) preparing an aqueous solution or suspension of a plant gum having a dry mass content of from 0.1 to 60 weight-%, based on the total amount of the aqueous solution or suspension, whereby the plant gum has a protein part;
b) hydrolysing the protein part of the plant gum until a degree of hydrolysis of the protein part of up to 30%, preferably from about 1 to about 30%, is obtained; and/or hydrolysing the polysaccharide part of the plant gum until a degree of hydrolysis of the polysaccharide part of up to 50%, preferably from about 0.05 to about 20%, is obtained;
c) optionally fractionating the hydrolysate;
d) converting the optionally fractionated hydrolysate into a solid form.

The steps a) to d) are explained in more detail in the following. Reference is also made to the according parts of the description of the steps A) to D) above and the preferences mentioned there.

Step a)

Suitable plant gums (polysaccharide based hydrocolloids) for use in this step and preferred examples thereof are mentioned in the description of step A) above. The protein part of the plant gum is conventionally of about ≤10 weight-%, especially of about ≤6 weight-%, preferably of from about 0.5 to about 6 weight-%, more preferably of about ≤4 weight-%, even more preferably of about 0.5 to about 4 weight-%, most preferably of about 2 to about 4 weight-%, based on the total weight of the plant gum.

Step b)

The hydrolysis of step b) (the hydrolysis of the protein part) can be achieved by adjusting the pH of the plant gum solution or suspension to a value of between about 2 and about 10, preferably to a value of between about 2 and about 9, more preferably to a value of between about 4 and about 8. In a preferred embodiment of the invention additionally a protease is added to such an adjusted solution/suspension.

In a more preferred embodiment of the invention not only the protein part of the plant gum, but also the sugar/polysaccharide part of the plant gum is hydrolysed. This can be achieved by adding after or before or simultaneously with the protease a glycosylase to the aqueous solution or suspension of the plant gum.

In other preferred embodiments of the invention only the sugar/polysaccharide part of the plant gum is hydrolysed. This can be achieved by adding a glycosylase to the aqueous solution or suspension of the plant gum.

Suitable proteases and glycosylases for use in this step and preferred examples thereof are mentioned in the description of step A) above.

The amount of the protease and/or glycosylase each is independently from each other preferably of from about 0.01 to about 10 weight-%, based on the dry weight of the plant gum. Conventionally step b) is carried out at a temperature of from about 5 to about 120° C., preferably at a temperature of from about 5 to about 70° C., more preferably at a temperature of from about 20 to about 55° C.

Preferably step b) is stopped when the protein part of the plant gum solution or suspension is hydrolysed to a degree of from about 1% to about 10% and/or the polysaccharide part of the plant gum is hydrolysed to a degree of from about 1% to about 5%. In certain embodiments of the present invention step b) is stopped, when the protein part of the plant gum is hydrolysed to a degree between 0.05 and 1% and optionally the polysaccharide part of the plant gum is hydrolysed up to a degree of 50%, preferably to a degree of from about 0.05% to about 20%, more preferably of from about 1% to about 5%.

The absolute degree of hydrolysis can be determined in a manner known to those skilled in the art, e.g. as described by Petersen, D., Nielsen, P. M., Dambmann C., Determination of the Degree of Hydrolysis (DH) based on OPA Reaction, ED-9512723, Novo Nordisk A/S, December 1995; Petersen, D., Nielsen, P. M., Dambmann C., Journal of Food Science 2001, 66 (5). 642-646 ("Improved method for determining food protein degree of hydrolysis."); Frister, H., Meisel, H., Schlimme, E., OPA method modified by use of N,N-dimethyl-2-mercaptoethylammonium chloride as thiol component, Fresenius J. Anal. Chem. 330 (1988) 631. As already mentioned above for a plant gum with a low content of protein such as gum acacia (gum Arabic) from *Acacia senegal* or *Acacia seyal* low degrees of hydrolysis, i.e. degrees of hydrolysis up to 5%, preferably between 0.05% to 2%, more preferably between 0.05% and 1%, may be determined preferably by the modified OPA method as described in examples 7 and 8. The relative degree of hydrolysis (relative to the polysaccharide part) can be determined by osmolality (W. Dzwokak and S. Ziajka, Journal of food science, 1999, 64 (3) 393-395; see also example 9). The reaction can be stopped by neutralising the solution or suspension if an inorganic or organic acid or base is used or by heating to denature the protease that may preferably be used to hydrolyse the protein part of the plant gum. The reaction of the glycosylase may be stopped in the same way.

Step c) and d)

See the description of step C) and D) above.

Preferred Embodiments of this Process of the Invention

In an especially preferred embodiment of the invention the plant gum is subjected not only to enzymatic hydrolysis by using proteases, but also to further enzymatic treatment by using polysaccharide-cleaving enzymes, so called glycosylases. This procedure can be carried out with either the aqueous solution or suspension of the modified plant gum after incubating with the proteases or with the solid form of the modified plant gum. In a further aspect of the invention plant gums can be subjected to enzymatic treatment by using polysaccharide-cleaving enzymes in a first step and optionally subjecting the so-obtained modified plant gums to enzymatic hydrolysis by using proteases in a second step. The enzymatic treatment by using polysaccharide-cleaving enzymes is carried out by adjusting the solution or suspension of plant gums or modified plant gums as described above to a pH of between about 2 and about 9, preferably to a pH of between about 4 and about 8, e.g. by the addition of any 0.1 to 5 M, preferably 0.5 to 2 M, organic and/or inorganic acid or base such as hydrochloric acid and sodium hydroxide, respectively and preferably brought to a temperature of from about 20 to about 60° C., especially from about 30 to about 40° C., particularly to about 35° C. The enzyme used may be a pectinase having a distinct activity to certain sugar units or an enzyme preparation with mixed and/or side activities may be used. The enzyme is added to provide a concentration of from about 0.01 to about 10 weight-%, preferably of from about 0.1 to about 1 weight-%, based on the dry weight of the plant gum. The enzymatic hydrolysis is carried out for 1 to 600 minutes until the desired emulsifying properties in the end product are reached. The enzyme is then inactivated, suitably by heating of the incubation batch.

In a preferred embodiment of the process of the invention, the enzyme mixture of protease and glycosylase is added at once. The enzymatic hydrolysis may also be carried out stepwise. For instance, the enzyme mixture is added to the incubation batch in an amount of e.g. 1% whereupon, e.g. after 5 to 10 minutes (at a temperature of 35° C.) further enzyme mixture which may by the same or different from the first added enzyme mixture is added, e.g. in an amount of 2% whereupon the plant gum is further hydrolysed at 35° C. for about 10 minutes.

Especially the process according to the invention for modification of the plant gum described above lead to overall improved functional properties of the gum such as better emulsifying properties, generally higher and faster solubility in aqueous solution e.g. lower susceptibility to pH and counter ions as well as better cold water solubility, better temperature resistance, and better film-forming properties.

A further aspect of the invention is a modified plant gum as obtainable by the process according to the invention described above, as well as a modified plant gum the protein part of which is hydrolysed up to a degree of about 30%, preferably up to a degree of from about 1 to about 30%, more preferably to a degree of from about 1 to about 10%, most preferably to a degree of from about 1 to about 5%. Another aspect of the present invention is a modified plant gum as obtainable by the process according to the invention described above, as well as a modified plant gum the protein part of which is hydrolysed between 0.05 and 1%. Such a modified plant gum preferably has a protein part before hydrolysis of about ≤10 weight-%, especially of about ≤6 weight-%, preferably of from about 0.5 to about 6 weight-%, more preferably of about ≤4 weight-%, even more preferably of about 0.5 to about 4 weight-%, most preferably of about 2 to about 4 weight-%, based on the total weight of the plant gum.

Another aspect of the present invention is a modified plant gum whose polysaccharide part is hydrolysed up to a degree of about 50%, preferably to a degree of from about 0.05 to about 20%, more preferably to a degree of from about 1 to about 5%.

A further aspect of the present invention is a modified plant gum as obtainable by the process according to the present invention described above whose protein part is hydrolysed up to a degree of about 30%, preferably to a degree of from about 0.05 to about 30%, more preferably to a degree of from about 0.05 to about 10%, most preferably to a degree of from about 0.05 to about 5%, and whose polysaccharide part is hydrolysed up to a degree of about 50%, preferably to a degree of from about 0.05 to about 20%, more preferably to a degree of from about 1 to about 5%.

Process for the Manufacture of the Compositions According to the Invention

The present invention is further related to a process for the manufacture of such compositions as described above comprising the following steps:
I) preparing an aqueous solution or colloidal solution of a modified plant gum, preferably of a modified plant gum obtainable by the process of the invention as described above comprising the steps a) to d),
II) optionally adding at least a water-soluble excipient and/or adjuvant to the solution pre-pared in step I),
III) preparing a solution or dispersion of at least an active ingredient, preferably of at least a fat-soluble active ingredient, and/or colorant and optionally at least a fat-soluble adjuvant,
IV) mixing the solutions prepared in step I) to III) with each other,
V) homogenising the thus resulting mixture,
VI) optionally adding a cross-linking agent selected form the group consisting of reducing sugars, (glyco)proteins, protein hydrolyates and (glyco)peptides,
VII) optionally converting the dispersion obtained in step V) and/or VI) into a powder,
VIII) optionally drying the powder obtained in step VII),
XI) optionally submitting the dry powder to heat treatment or to enzymatic treatment to cross-link the modified plant gum.

This process for the manufacture of the compositions of the present invention can be carried out in an according manner as disclosed for the preparation of matrix-based compositions of (fat-soluble) active ingredient and/or colorant compositions for enrichment, fortification and/or coloration of food, beverages, animal feed, cosmetics or pharmaceutical compositions, e.g. in EP-A 0 285 682, EP-A 0 347 751, EP-A 0 966 889, EP-A 1 066 761, EP-A 1 106 174, WO 98/15195, EP-A 0 937 412, EP-A 0 065 193 or the corresponding U.S. Pat. No. 4,522,743, WO 02/102298, EP-A 1 300 394 and in EP-A 0 347 751, the contents of which are incorporated herein by reference.

Step II
Examples of water-soluble excipients and/or adjuvants are monosaccharides, disaccharides, oligosaccharides and polysaccharides, glycerol and water-soluble antioxidants. Examples of them are given above.
Step III
The (fat-soluble) active ingredient and/or colorant and optional fat-soluble excipients and adjuvents are either used as such or dissolved or suspended in a triglyceride and/or an (organic) solvent.
Suitable organic solvents are halogenated aliphatic hydrocarbons, aliphatic ethers, aliphatic and cyclic carbonates, aliphatic esters and cyclic esters (lactones), aliphatic and cyclic ketones, aliphatic alcohols and mixtures thereof.
Examples of halogenated aliphatic hydrocarbons are mono- or polyhalogenated linear, branched or cyclic $C_1$- to $C_{15}$-alkanes. Especially preferred examples are mono- or polychlorinated or -brominated linear, branched or cyclic $C_1$- to $C_{15}$-alkanes. More preferred are mono- or polychlorinated linear, branched or cyclic $C_1$- to $C_{15}$-alkanes. Most preferred are methylene chloride and chloroform.
Examples of aliphatic esters and cyclic esters (lactones) are ethyl acetate, isopropyl acetate and n-butyl acetate; and γ-butyrolactone.
Examples of aliphatic and cyclic ketones are acetone, diethyl ketone and isobutyl methyl ketone; and cyclopentanone and isophorone.
Examples of cyclic carbonates are especially ethylene carbonate and propylene carbonate and mixtures thereof.
Examples of aliphatic ethers are dialkyl ethers, where the alkyl moiety has 1 to 4 carbon atoms. One preferred example is dimethyl ether.
Examples of aliphatic alcohols are ethanol, iso-propanol, propanol and butanol. Furthermore any oil (triglycerides), orange oil, limonen or the like and water can be used as a solvent.
Step IV
The (fat-soluble) active ingredient and/or colorant or the solution or dispersion thereof, respectively, is then added to the aqueous (colloidal) solution with stirring.
Step V
For the homogenisation conventional technologies, such as high-pressure homogenisation, high shear emulsification (rotor-stator systems), micronisation, wet milling, microchanel emulsification, membrane emulsification or ultrasonification can be applied. Other techniques used for the preparation of compositions containing (fat-soluble) active ingredients and/or colorant for enrichment fortification and/or coloration of food, beverages, animal feed, cosmetics or pharmaceutical compositions are disclosed in EP-A 0 937 412 (especially paragraphs [0008], [0014], [0015], [0022] to [0028]), EP-A 1 008 380 (especially paragraphs [0005], [0007], [0008], [0012], [0022], [0023] to [0039]) and in U.S. Pat. No. 6,093,348 (especially column 2, line 24 to column 3, line 32; column 3, line 48 to 65; column 4, line 53 to column 6, line 60), the contents of which are incorporated herein by reference.
Step VI
If a cross-linking agent is added and a powder is desired, the composition is submitted to heat or enzymatic treatment prior to drying.
Step VII and VIII
The so-obtained dispersion, which is an oil-in-water dispersion, can be converted after removal of the organic solvent (if present) into a solid composition, e.g. a dry powder, using any conventional technology such as spray drying, spray drying in combination with fluidised bed granulation (the latter technique commonly known as fluidised spray drying or FSD), or by a powder-catch technique whereby sprayed emulsion droplets are caught in a bed of an absorbent, such as starch, and subsequently dried. Drying may be performed at an inlet-temperature of from about 100 to about 250° C., preferably of from about 150° C. to about 200° C., more preferably of from about 160 to about 190° C., and/or at an outlet-temperature of from about 45 to about 160° C., preferably of from about 55 to about 110° C., more preferably of from about 65 to about 95° C.

Step IX

The heat or enzymatic treatment according to step VIII) may be performed as already described above. If the dispersion obtained in step VI) is submitted to an enzymatic treatment step IX) is carried out prior to any drying, i.e. before step VIII.

For the production of liquid and solid product forms such as oil-in-water suspensions, oil-in-water emulsions or powders the hydrocolloids used therein act as multifunctional ingredients. For this purpose these hydrocolloids should show a spectrum of functional properties such as excellent dispersion stabilising properties, high emulsifying capacity and efficiency (the latter being relevant with respect to the particle size distribution of the inner phase of the dispersion), high solubility and well adapted viscosity in aqueous solution, thermal stability, low susceptibility to pH, ion strength and charge, superior film-forming as well as acceptable gas and water vapour barrier properties in solid product forms.

The present invention is also directed to the use of compositions as described above for the enrichment, fortification and/or coloration of food, beverages, animal feed, cosmetics or pharmaceutical compositions.

Other aspects of the invention are food, beverages, animal feed, cosmetics and pharmaceutical compositions containing a composition as described above.

Beverages wherein the product forms of the present invention can be used as a colorant or a functional ingredient can be carbonated beverages e.g., flavoured seltzer waters, soft drinks or mineral drinks, as well as non-carbonated beverages e.g. flavoured waters, fruit juices, fruit punches and concentrated forms of these beverages. They may be based on natural fruit or vegetable juices or on artificial flavours. Also included are alcoholic beverages and instant beverage powders. Besides, sugar containing beverages diet beverages with non-caloric and artificial sweeteners are also included.

Further, dairy products, obtained from natural sources or synthetic, are within the scope of the food products wherein the product forms of the present invention can be used as a colorant or as a functional ingredient. Typical examples of such products are milk drinks, ice cream, cheese, yoghurt and the like. Milk replacing products such as soymilk drinks and tofu products are also comprised within this range of application.

Also included are sweets which contain the product forms of the present invention as a colorant or as a functional ingredient, such as confectionery products, candies, gums, desserts, e.g. ice cream, jellies, puddings, instant pudding powders and the like.

Also included are cereals, snacks, cookies, pasta, soups and sauces, mayonnaise, salad dressings and the like which contain the product forms of the present invention as a colorant or a functional ingredient. Furthermore, fruit preparations used for dairy and cereals are also included.

The final concentration of the (fat-soluble) active ingredient and/or the colorant which is added via the product forms of the present invention to the food products may be from about 0.1 to about 500 ppm, particularly from about 1 to about 50 ppm based on the total weight of the food composition and depending on the particular food product to be coloured or fortified and the intended grade of coloration or fortification.

The food compositions of this invention are preferably obtained by adding to a food product the (fat-soluble) active ingredient and/or the colorant in the form of a composition of this invention. For coloration or fortification of a food or a pharmaceutical product a composition of this invention can be used according to methods per se known for the application of water dispersible solid product forms.

In general the composition may be added either as an aqueous stock solution, a dry powder mix or a pre-blend with other suitable food ingredients according to the specific application. Mixing can be done e.g. using a dry powder blender, a low shear mixer, a high-pressure homogeniser or a high shear mixer depending on the formulation of the final application. As will be readily apparent such technicalities are within the skill of the expert.

Pharmaceutical compositions such as tablets or capsules wherein the compositions are used as a colorant are also within the scope of the present invention. The coloration of tablets can be accomplished by adding the product forms in form of a liquid or solid colorant composition separately to the tablet coating mixture or by adding a colorant composition to one of the components of the tablet coating mixture. Coloured hard or soft-shell capsules can be prepared by incorporating a colorant composition in the aqueous solution of the capsule mass.

Pharmaceutical compositions such as tablets such as chewable tablets, effervescent tablets or filmcoated tablets or capsules such as hard shell capsules wherein the compositions are used as an active ingredient are also within the scope of the present invention. The product forms are typically added as powders to the tableting mixture or filled into the capsules in a manner per se known for the production of capsules.

Animal feed products such as premixes of nutritional ingredients, compound feeds, milk replacers, liquid diets or feed preparations wherein the compositions are either used as a colorant for pigmentation e.g. for egg yolks, table poultry, broilers or aquatic animals or as an active ingredient are also within the scope of the present invention.

Cosmetics, toiletries and derma products i.e. skin and hair care products such as creams, lotions, baths, lipsticks, shampoos, conditioners, sprays or gels wherein the compositions are used as a colorant or as an active ingredient are also within the scope of the present invention.

The following non limiting examples illustrate the invention further.

EXAMPLES

Example 1

An aqueous suspension of the plant gum from *Acacia senegal* having a dry matter content of 30 weight-%, based on the total amount of the aqueous suspension, is adjusted to pH 6 with 0.5 N NaOH and to a temperature of 35° C. Thereafter, 1.0 weight-%—based on the total amount of the aqueous suspension—of a protease of *Aspergillus oryzae*, e.g the enzyme preparation Flavourzyme® 500 L of Novozymes, Bagsvaerd, Denmark with an activity of 500 Leucine Amino Peptidase Units per gram (500 LAPU/g), is added. During the enzymatic hydrolysis the pH is maintained constant by the addition of 0.5 N NaOH solution and the temperature is maintained at 35° C. After a reaction time of 5 to 10 minutes the protease is inactivated by heating the suspension to 85° C. for 10 minutes. The solution is purified by ultrafiltration using membranes with nominal molecular weight cut-offs from 10 to 1000 kDa. The solution is spray-dried at a product temperature of 70 to 80° C., whereby the inlet temperature is 160 to 190° C.

Example 2

An aqueous suspension of the plant gum from *Acacia senegal* having a dry matter content of 10 weight-%, based on the total amount of the aqueous suspension, is adjusted to pH 7.4 with 0.5 N NaOH and to a temperature of 20° C. Thereafter, 0.2 weight-%—based on the total amount of the aqueous suspension—of a proteolytic enzyme produced from *Bacillus licheniformis* e.g. Subtilisin Carlsberg, commercially available as Alcalase® 2.4 L of Novozymes, Bagsvaerd, Denmark, is added. During the enzymatic hydrolysis the pH is maintained constant by the addition of 0.5 N NaOH solution and the temperature is maintained at 20° C. After a reaction time of 10 minutes the protease is inactivated by heating the suspension to 85° C. for 10 minutes. The solution is purified by ultrafiltration using a polysulfon-membrane with a nominal molecular weight cut-off of 100 kDa. The solution is spray-dried at a product temperature of 68 to 75° C., whereby the inlet temperature is 160 to 190° C.

Example 3

An aqueous suspension of the plant gum from *Acacia senegal* having a dry matter content of 20 weight-%, based on the total amount of the aqueous suspension, is adjusted to pH 6 with 0.5 N NaOH and to a temperature of 35° C. After 10 to 30 minutes the solution is purified by ultrafiltration using membranes with nominal molecular weight cut-offs from 10 to 100 kDa. The solution is spray-dried at a product temperature of 70 to 80° C., whereby the inlet temperature is 160 to 190° C.

Example 4

A composition comprising a modified plant gum and β-carotene is prepared as follows:
a) Preparation of a(n Oil-Based) Solution A:
  9.7 g of corn oil and 2.7 g of dl-α-tocopherol were mixed. 8.9 g of crystalline α-carotene were dispersed in 120 ml of chloroform (trichloromethane) and the resulting dispersion was added to the mixture of corn oil and tocopherol. By gently stirring and simultaneous heating the mixture to about 65° C. a solution was obtained.
b) Preparation of a(n Aqueous) Solution B:
  A dry powder of 111.0 g of the plant gum Quick Gum® of Alfred L. Wolff (Hamburg, Germany), prepared from *Acacia senegal*, was subsequently mixed with 220 ml of deionised water at room temperature. Under stirring the mixture was heated to 35° C. and by adding 18.2 ml of a 0.5 N sodium hydroxide solution the pH of the mixture was brought to a value of 6.0. 1.0 ml of the protease Flavourzyme® 500 L of Novozymes was added and the mixture was stirred for 10 minutes in order to achieve a homogeneous hydrolysis of the solution and the pH was maintained by adding 0.5 N sodium hydroxide solution (pH-stat-method). The enzyme was deactivated by heating the solution to 85° C. for 10 minutes. The solution was then cooled to 35° C. By adding 4.1 ml of a 0.5 N hydrochloric acid the pH of the mixture was brought to a value of 5.0 and kept at 35° C. In a second step of the enzymatic treatment 1.0 ml of a mixture of the pectinases Pectinex Ultra SP-L® and Shearzyme® at a volume ratio of 80:20, both of Novozymes, Bagsvaerd, Denmark, was added and the mixture was stirred for 30 minutes in order to achieve a homogeneous hydrolysis of the solution. The enzymes were deactivated by heating the solution to 85° C. for 10 minutes. The solution was then cooled to 50° C.
c) Preparation of an Emulsion from the Solutions A and B:
  Under vigorous stirring solution A was added to solution B at 50° C. and the dispersion was vigorously stirred for another 30 minutes. The stirred dispersion was kept at 50 to 55° C. for 30 minutes. Residual trichloromethane was removed at 50 to 55° C. After removing entrapped air bubbles by centrifugation the emulsion was gently stirred at 50 to 55° C. for some minutes and then characterised with respect to the particle size of the inner phase. The mean particle size (Sauter diameter, D[3, 2]) of the inner phase of the emulsion was 430 to 480 nm as measured by laser diffraction (Malvern Mastersizer).

Example 5

A composition comprising a modified plant gum and β-carotene is prepared as follows:
a) Preparation of a(n Oil-Based) Solution A:
  The preparation was carried out as described in Example 4a).
b) Preparation of (Aqueous) Solution B:
  A dry powder of 110 g of the modified plant gum prepared from plant gum according to Example 2 was subsequently mixed with 220 ml of deionised water at room temperature. The suspension was stirred for 120 min.
c) Preparation of an Emulsion from the Solutions A and B:
  Under vigorous stirring solution A was added to solution B at 50° C. and the dispersion was vigorously stirred for another 30 minutes. The stirred dispersion was kept at 50 to 55° C. for 60 minutes. Residual trichloromethane was removed at 50 to 55° C. After removing entrapped air bubbles by centrifugation the emulsion was gently stirred at 50 to 55° C. for some minutes and then characterised with respect to the particle size of the inner phase. The mean particle size (D[3, 2]) of the inner phase of the emulsion was 40 to 410 nm as measured by laser diffraction (Malvern Mastersizer).
d) Preparation of a Solid Composition from the Emulsion:
  The emulsion was sprayed into a pre-cooled fluidised bed of cornstarch. Excess cornstarch was removed by sieving and the powder obtained was dried in an air stream at room temperature for about 2 hours. Sieving collected the powder particle fraction (approximately 250 g) in the range of 0.16 to 0.50 mm and characterised with respect to the carotenoid content, the colour intensity and the colour hue in an aqueous dispersion, the content of the corn starch and residual humidity.
  The obtained powder had a β-carotene content of 4.9 weight-% (3.9 weight-%), as measured by UV/VIS-spectroscopy (HPLC), a content of 37.0 weight-% of corn starch and a residual water content of 8.2 weight-%. The powder was dispersed in deionised water and the extinction was measured in a 1 cm quartz precision cell against deionised water. For a 5 ppm dispersion of β-carotene an extinction of 314 at a wavelength of 536 nm was calculated [E (1%, 1 cm)=314]. The colour values L*=87.1, a*=12.9 and b*=7.4 were measured according to the CIE-system (D. L. MacAdam, Color Measurement, second edition, Springer Verlag, Berlin Heidelberg, N.Y., Tokyo, 1985, pages 160 to 221) for a 5 ppm dispersion of β-carotene with a Hunterlab Ultrascan Spectrocolorimeter (1 cm, TTRAN). Based upon the values of a* and b* a colour hue angle h*=30.0° at a saturation (chroma value) C*=14.9 can be calculated.

Example 6

A dry premix of 238 g of a modified plant gum obtained according to example 1, 2 or 3, 50 g of sucrose and 282 g of a maltodextrin (DE 20 to 23) was prepared. The dry premix was dissolved in 700 ml of deionized water at 60° C. After complete dissolution of the solids 7.2 g of sodium ascorbate was added to the mixture (=solution A).

110 g of a triglyceride (MCT) and 0.7 g of dl-α-tocopherol were mixed and heated to 170° C. Subsequently 31 g of β-carotene were suspended in the mixture of the triglyceride and tocopherol. By stirring for about 10 minutes at 170° C. a clear solution of β-carotene was obtained (=solution B).

Solution A was heated to about 80° C. and a crude emulsion was prepared by adding solution B to solution A while gently stirring. A fine emulsion was obtained by high pressure homogenizing treatment of the preemulsion at 300 bar within two passages (APV Lab Homogenizer Type Gaulin Lab 40-10 RBFI of APV Switzerland AG, CH-3076 Worb). The emulsion was spray-dried in a laboratory spray dryer (Mobile Minor of GEA Niro A/S, DK-2860 Söborg) at an inlet temperature of 200° C. to 210° C. and an outlet temperature of 70 to 75° C. The spray-dried powder was dried in a vacuum oven at room temperature over night. A fine powder was obtained.

Example 7: Determination of the Correction Factors α and β for Gum Arabic $$DH = \frac{h}{h_{tot}} * 100\% \quad \text{(Formula I)}$$

DH=degree of hydrolysis; h=number of hydrolyzed peptide bonds; $h_{tot}$=total number of peptide bonds.

$h_{tot}$ [milli equivalents Serin-$NH_2$ per g; meqv Serin-$NH_2$/g] refers to the amino acid composition of the protein and is calculated as sum of the amounts of the amino acids (mmol) of the individual amino acid composition per g protein (J. Adler-Nissen, Enzymic Hydrolysis of food proteins; Elsevier Allied Science Publishers, London 1986, p. 115-131).

A calculation with the amino acid compositions given in R. C. Randall, G. O. Phillips, P. A. Williams, Food Hydrocolloids 1989, 3(1), p. 65-75, Table III, entries "this study" and "reference 19", results in a $h_{tot}$ of gum arabic Senegal of 8.128 meqv/g protein and 8.258 meqv/g protein, respectively. If the amino acid composition given in M. E. Osman et al., Phytochemistry 1995, 38(2), p. 409-417, is taken as basis for the calculation a $h_{tot}$ of 8.292 meqv/g protein results. The average $h_{tot}$ (of these three data) is 8.226 meqv/g protein for gum arabic Senegal. Therefore, the further calculation is based on this numerical value.

It is also possible to determine the amino acid composition via analysis of the total hydrolysate and calculate $h_{tot}$ on basis of these experimentally determined data.

$$h = \frac{\text{Serin-}NH_2 - \beta}{\alpha} \text{ meqv/g protein} \quad \text{(Formula II)}$$

To get more exact results the correction factors α and β were determined experimentally. For this the following values have to be known: $h_{tot}$, the absorption of native gum arabic (the native plant gum with a low protein content) and the absorption of totally hydrolysed gum arabic (the totally hydrolysed plant gum with a low protein content).

Serin-$NH_2$=meqv Serin-$NH_2$/g protein, i.e. the number of free amino groups per g protein, is calculated according to D. Petersen, P. M. Nielsen, C. Dambmann, Determination of the Degree of Hydrolysis based on OPA reaction, ED-9512723, Novo Nordisk A/S, 1995; Petersen, D., Nielsen, P. M., Dambmann C., Journal of Food Science 2001, 66 (5). 642-646 ("Improved method for determining food protein degree of hydrolysis.") as follows:

$$\text{Serin-}NH_2 = \frac{Abs_{sample} - Abs_{control}}{Abs_{standard} - Abs_{control}} * \quad \text{(Formula III)}$$

$$0.9516 \text{ meqv/l} * \frac{V*100}{X*P} * \text{l/g protein}$$

$Abs_{sample}$=absorption of the sample to be measured
$Abs_{control}$=absorption of a control sample
$Abs_{standard}$=absorption of a standard solution of serine
X=weight of the sample [g]
P=Protein content of the sample
V=volume of the sample solution [l]; in our examples: 0.1 l The determination of DH was based on a modified OPA reaction as disclosed by H. Frister, H. Meisel, E. Schlimme, Anal. Chem. 1988, 330, 631-633.

a) Preparation of the OPA Solution

Solution 1: 7.620 g of Borax were dissolved in 100 g of demineralised water.

Solution 2: 0.160 g of ortho-phthaldialdehyde (OPA) were dissolved in 4 ml of ethanol.

Solution 3: 0.400 g of N,N-dimethyl-2-mercaptoethylammonium chloride (="DMMAC") were dissolved in a small amount of demineralised water.

All solutions 1 to 3 were put together in a 200 ml flask. 0.200 g of sodium dodecyl sulphate (="SDS") were added and demineralised water was added to get a total of 200 ml of the OPA solution. Under exclusion of light the OPA solution can be stored for one week.

b) Preparation of the Samples the Control Sample and the Standard Solution of Serine and Measurement of their Absorption Native gum arabic as well as totally hydrolysed gum arabic were tested. (Other plant gums with a low protein content may also be measured accordingly.) To 0.1 mg of powderous gum arabic (It is recommended that in case of plant gums with a low protein content the 10-fold amount is used in comparison to plant gums with a high protein content.) was added an aqueous 10 weight-% SDS solution and the mixtures were stirred for 10 minutes at 90° C. Afterwards the solution was filled up with demineralised water to give a total of 100 ml, it was then centrifugated for 10 minutes at 10750 g and filtered over a 0.45 μm filter. To 400 μl of this resulting solution 3 ml of the OPA solution were added. The mixture was stirred and measured then in a spectral photometer (Lambda 25, Perkin Elmer Instruments, Boston, USA) at 340 nm exactly two minutes after preparation of the mixture. The sample of the totally hydrolysed gum arabic was prepared and measured accordingly. The control sample was demineralised water. To 400 μl of demineralised water 3 ml of the OPA solution were added.

The mixture was stirred and measured then in a spectral photometer (Lambda 25, Perkin Elmer Instruments, Boston, USA) at 340 nm exactly two minutes after preparation of the mixture.

0.100 g of L-serine were dissolved in 500 ml of demineralised water to give the standard solution of serine which is used for the purpose of calibration. Standard solutions of serine with concentrations ranging between 10 and 200 mg/l were measured therefore. To each of 400 µl of the standard solution of serine of a certain concentration 3 ml of the OPA solution were added. The mixture was stirred and measured then in a spectral photometer (Lambda 25, Perkin Elmer Instruments, Boston, USA) at 340 nm exactly two minutes after preparation of the mixture.

c) Calculation of α and β

With the measured values for $Abs_{sample}$, $Abs_{control}$, and $Abs_{standard}$ (each measured twice and the average value taken) and with further taken into account the coloration of the sample of the totally hydrolyzed gum arabic $Ser-NH_2$ could be calculated according to formula III given above.

Under the assumptions that the number of hydrolysed peptide bonds in native gum arabic is zero ($\beta=Ser-NH_2$) and that the degree of hydrolysis is 100% for totally hydrolyzed gum arabic (i.e. $h=h_{tot}$), α and β can be calculated:

For gum arabic Senegal α is 1.999 meqv/g protein and β is 0.588 meqv/g protein.

The method as described above for gum arabic Senegal may be applied accordingly to other plant gums with a low protein content, especially with a protein content≤5 weight-%, based on the total weight of the plant gum.

Example 8: Determination of the Degree of Hydrolysis (DH) of Gum Arabic

With the now known correction factors α and β for gum arabic Senegal (α=1.999 meqv/g protein; β=0.588 meqv/g protein) it is now possible via measuring the absorption at 340 nm (to determine $Ser-NH_2$ via formula III) to calculate the number of hydrolysed peptide bonds h via formula II and thus also the DH via formula I (see above).

$$h = \frac{Serin\text{-}NH_2 - \beta}{\alpha} \text{ meqv/g protein} \quad \text{(Formula II)}$$

The accuracy of such a DH is ca.±0.05%.

If for other plant gums with a low protein content, especially with a protein content≤5 weight-%, based on the total weight of the plant gum, the correction factors α and β were also determined according to example 7, their DH can also be calculated accordingly to the method described above.

Example 9: Determination of the Degree of Hydrolysis of the Polysaccharide Part of Gum *Acacia*

To an aqueous suspension of the plant gum from *Acacia senegal* having a dry matter content of 10 weight-%, based on the total amount of the aqueous suspension, is added 1 weight-%—based on the amount of the plant gum—of an enzyme produced from *Aspergillus aculeateus* e.g. commercially available as Peelzym® of Novozymes, Bagsvaerd, Denmark. The solution is then heated up at 50° C. during 10 min without agitation and an aliquot of 0.15 mL is used to determine the relative degree of hydrolysis of sugar part by Osmolality (micro Osmometer, KNAUER). The read value is converted into relative degree of hydrolysis using the next formula, and taking as presumption that the osmotic coefficient for peptides (w) and the total number of peptides bonds (h tot) are constant during this hydrolysis:

$$DH = \frac{DC}{S\%} \frac{1}{fosm} \frac{1}{w} \frac{1}{htot} * 100$$

DH: degree of hydrolysis;
DC: Osmolality ($mOsm \cdot kg^{-1}$)
S %: substrate concentration
f osm: conversion factor calculated on the basis of percentage content of dry matter in substrate (D %)

$$fosm = \frac{1000}{(100 - D\%)}$$

w: osmotic coefficient for peptides
$h_{tot}$: total number of peptides bonds (mM g $proteins^{-1}$)

Example 10

A composition comprising a modified plant gum and α-carotene is prepared as follows:

a) Preparation of a(n Oil-Based) Solution A:

9.7 g of corn oil and 2.7 g of dl-α-tocopherol were mixed. 8.9 g of crystalline β-carotene were dispersed in 120 ml of chloroform (trichloromethane) and the resulting dispersion was added to the mixture of corn oil and tocopherol. By gently stirring and simultaneously heating the mixture to about 65° C. a solution was obtained.

b) Preparation of a(n Aqueous) Solution B:

A dry powder of 111.0 g of the plant gum Quick Gum® of Alfred L. Wolff (Hamburg, Germany), prepared from *Acacia senegal*, was subsequently mixed with 220 ml of deionised water at room temperature. Under stirring the mixture was heated to 50° C. and the pH was brought to a value of 7.0.

c) Preparation of an Emulsion from the Solutions A and B:

Under vigorous stirring solution A was added to solution B at 50° C. and the dispersion was vigorously stirred for another 30 minutes. The stirred dispersion was kept at 50 to 55° C. for 30 minutes. Residual trichloromethane was removed at 50 to 55° C. After removing entrapped air bubbles by centrifugation the emulsion was gently stirred at 50 to 55° C. for some minutes and then characterised with respect to the particle size of the inner phase. The mean particle size (Sauter diameter, D[3, 2]) of the inner phase of the emulsion was 350 nm as measured by laser diffraction (Malvern Mastersizer).

Example 11

An aqueous suspension of the plant gum from *Acacia senegal* having a dry matter content of 10 weight-%, based on the total amount of the aqueous suspension, is adjusted to pH 7.0 with 0.5 N NaOH and to a temperature of 20° C. Thereafter, 0.5 weight-%—based on the total amount of the protein—of a proteolytic enzyme produced from *Carica papaya*, commercially available as Collupilin® L of DSM food beverages, Delft, Netherlands, is added. During the enzymatic hydrolysis the pH is maintained constant by the addition of 0.5 N NaOH solution and the temperature is maintained at 20° C. After a reaction time of 5 minutes the protease is inactivated by heating the suspension to 85° C. for 10 minutes. The solution is spray-dried at a product temperature of 68 to 75° C., whereby the inlet temperature is 160 to 190° C.

Example 12

A composition comprising a modified plant gum and β-carotene is prepared as follows:
a) Preparation of a(n Oil-Based) Solution A:
The preparation was carried out as described in Example 4a).
b) Preparation of (Aqueous) Solution B:
A dry powder of 110 g of the modified plant gum prepared from plant gum according to Example 9 was subsequently mixed with 220 ml of deionised water at room temperature. The suspension was stirred for 120 min.
c) Preparation of an Emulsion from the Solutions A and B:
Under vigorous stirring solution A was added to solution B at 50° C. and the dispersion was vigorously stirred for another 30 minutes. The stirred dispersion was kept at 50 to 55° C. for 60 minutes. Residual trichloromethane was removed at 50 to 55° C. After removing entrapped air bubbles by centrifugation the emulsion was gently stirred at 50 to 55° C. for some minutes and then characterised with respect to the particle size of the inner phase. The mean particle size (D[3, 2]) of the inner phase of the emulsion was 40 to 410 nm as measured by laser diffraction (Malvern Mastersizer).

The resulting emulsion was characterised with respect to the carotenoid content, the colour intensity and the colour hue in an aqueous dispersion.

The obtained emulsion had a β-carotene content of 3.0 weight-% (3.9 weight-%), as measured by UV/VIS-spectroscopy. The extinction coefficient in deionised water was measured in a 1 cm quartz precision cell against deionised water. For a 5 ppm dispersion of β-carotene an extinction of 283 at a wavelength of 518 nm was calculated [E (1%, 1 cm)=283]. The colour values L*=90.2, a*=−9.4 and b*=8.5 were measured according to the CIE-system (D. L. MacAdam, Color Measurement, second edition, Springer Verlag, Berlin Heidelberg, N.Y., Tokyo, 1985, pages 160 to 221) for a 5 ppm dispersion of β-carotene with a Hunterlab Ultrascan Spectrocolorimeter (1 cm, TTRAN). Based upon the values of a* and b* a colour hue angle h*=42.0° at a saturation (chroma value) C*=12.7 can be calculated.

The invention claimed is:

1. A composition comprising
 i) at least one modified plant gum,
 ii) at least one fat-soluble active ingredient and/or a colorant, and
 iii) at least one adjuvant and/or excipient,
wherein the modified plant gum has a protein content of ≤10 weight-%, based on the total weight of the modified plant gum,
wherein the fat-soluble active ingredient and/or a colorant ii) is a carotenoid selected from the group consisting of α-carotene, β-carotene, 8'-apo-β-carotenal, 8'-apo-β-carotenoic acid esters such as the ethyl ester, canthaxanthin, astaxanthin, lycopene, lutein, zeaxanthin or crocetin, α-zeacarotene, β-zeacarotene, or a mixture thereof,
wherein the amount of the modified plant gum i) is from 0.5 weight-% to 60.0 weight-%, the amount of the fat-soluble active ingredient and/or colorant ii) is from 3.0 weight-% to 80.0 weight-%, and the amount of the adjuvant and/or excipient iii) is from 10 to 95 weight-%, based on the total amount of the composition,
wherein the fat-soluble active ingredient and/or a colorant ii) is in a matrix of the modified plant gum,
wherein said modified plant gum is produced by hydrolysis comprising one or more of a) treatment of a plant gum from *Acacia senegal* or *Acacia seyal* with a hydrolase, and/or b) adjustment of the pH of the plant gum from *Acacia senegal* or *Acacia seyal* to a pH value of between about 2 and about 9 by addition of an organic and/or inorganic acid or base, to provide the modified plant gum,
wherein the protein of the modified plant gum is hydrolysed to a degree of from 1% to 30%,
wherein the adjuvant and/or excipient is an oligosaccharide, a polysaccharide, or a combination thereof, and
wherein the composition is in the form of a powder.

2. The composition according to claim 1, wherein the carotenoid is β-carotene.

3. The composition according to claim 1, further comprising a mono- or disaccharide selected from sucrose, invert sugar, xylose, glucose, fructose, lactose, maltose, saccharose and/or a sugar alcohol.

4. The composition according to claim 1, wherein the oligo- or polysaccharide is selected from a starch, a starch hydrolysate or a modified starch.

5. The composition according to claim 4, wherein the starch hydrolysate is present and is selected from a dextrin, a maltodextrin or a glucose syrup.

6. The composition according to claim 1, further comprising a triglyceride selected from a vegetable oil or fat.

7. The composition according to claim 1, wherein a co-emulgator selected from the group consisting of mono- and diglycerides of fatty acids, polyglycerol esters of fatty acids, lecithins, and sorbitan monostearate is additionally present.

8. The composition according to claim 1, wherein the hydrolysis is an enzymatic hydrolysis comprising treatment of the plant gum from *Acacia senegal* or *Acacia seyal* with a hydrolase.

9. The composition according to claim 8, wherein the hydrolase is a protease, a glycosylase, or a mixture thereof.

10. The composition according to claim 8, wherein the enzymatic hydrolysis is carried out at a temperature of from about 30° C. to about 40° C.

11. The composition according to claim 8, further comprising inactivation of the hydrolase at a temperature of from about 80° C. to about 85° C.

12. A food, beverage, animal feed, cosmetic and/or pharmaceutical composition comprising the composition according to claim 1.

* * * * *